United States Patent
Kamohara et al.

(10) Patent No.: US 6,987,140 B2
(45) Date of Patent: Jan. 17, 2006

(54) MOUTH GUARD COMPOSITION

(75) Inventors: Hiroshi Kamohara, Tokyo (JP); Takaharu Takeshita, Tokyo (JP)

(73) Assignee: GC Corporation, Tokyo (JP)

( * ) Notice: Subject to any disclaimer, the term of this patent is extended or adjusted under 35 U.S.C. 154(b) by 177 days.

(21) Appl. No.: 10/189,499

(22) Filed: Jul. 8, 2002

(65) Prior Publication Data
US 2003/0088011 A1 May 8, 2003

(30) Foreign Application Priority Data
Jul. 11, 2001 (JP) .............................. 2001-210409

(51) Int. Cl.
*C08L 91/06* (2006.01)
*C08L 91/08* (2006.01)
*C08L 53/00* (2006.01)
*C08J 5/00* (2006.01)

(52) U.S. Cl. .................. 524/277; 523/105; 523/121; 525/95

(58) Field of Classification Search ............... 523/105, 523/121; 524/277, 474, 487; 525/92 R, 525/95
See application file for complete search history.

(56) References Cited

U.S. PATENT DOCUMENTS 3,620,778 A * 11/1971 Morrell ................. 523/109
5,635,556 A * 6/1997 Rosenthal ............... 524/427
5,942,569 A * 8/1999 Simmons et al. .......... 524/487
6,235,818 B1 * 5/2001 Morizono et al. ........... 524/77
6,310,164 B1 * 10/2001 Morizono et al. .......... 526/339
6,372,336 B1 * 4/2002 Clausen et al. ............ 428/323
6,384,138 B1 * 5/2002 Jacob et al. ............... 525/89
6,397,848 B1 * 6/2002 Kagekata et al. .......... 128/862
2003/0075184 A1 * 4/2003 Persichetti ................ 128/861
2004/0005277 A1 * 1/2004 Willison et al. ............ 424/53

FOREIGN PATENT DOCUMENTS

DE 3705992 A * 8/1987
JP 62192441 A * 8/1987

* cited by examiner

*Primary Examiner*—Callie Shosho
(74) *Attorney, Agent, or Firm*—Oblon, Spivak, McClelland, Maier & Neustadt, P.C.

(57) ABSTRACT

To provide a mouth guard composition which hardly generates plastic deformation and which is high in fluidity during the formation after heating and softening and superior in fitness, and which even after repeated use of a mouth guard prepared therefrom, is free from sticking with respect to its surface and does not cause an offensive smell. The mouth guard composition is constituted of 39~98% by weight of a styrene block copolymer; 1~60% by weight of at least one thermoplastic resin selected from the group consisting of an alicyclic saturated hydrocarbon-based resin, a terpene resin, and an aliphatic petroleum resin; and 1~40% by weight of at least one wax selected from the group consisting of a mineral wax, a synthetic wax, a vegetable-based wax, and an animal-based wax.

16 Claims, No Drawings

MOUTH GUARD COMPOSITION

BACKGROUND OF THE INVENTION

1. Field of the Invention

The present invention relates to a mouth guard composition for preventing teeth and their surrounding tissues from a trauma occurred mainly in sports.

2. Description of the Related Art

A large external force is often applied to teeth or a maxillary bone during the game of hard physical contact sports including boxing, rugby football and American football as well as soccer and karate. In order to confine a trauma on teeth and their surrounding tissues occurred at that time to the minimum and to protect a stomatognathic system, it is generally carried out to set in an oral cavity an elastic material made of, for example, rubber, which is called a mouth guard or a mouth protector.

For the mouth guard, various materials are used. Those that are most widely used at the present are polyolefin rubbers and ethylene-vinyl acetate copolymers as well as compositions comprising an ethylene-vinyl acetate copolymer having a thermoplastic polycaprolactone added thereto, as disclosed in Japanese Patent No. 2,594,830. These materials have elasticity, and their effects are superior. However, when a large external force is applied to such materials and that is repeatedly applied to the mouth guard, the materials themselves were broken when used only a few times. In particular, in preparing a so-called "custom-made" mouth guard that a dentist makes according to the shape of an oral cavity of an individual for whom the mouth guard is to be set, since the mouth guard is expensive, it is required to give to it a high durability. Accordingly, it was a problem that the mouth guard has been broken within a short period of time.

In order to improve these problems of the related art, the present applicant proposed, in Japanese Laid-Open Patent No. 2001-54610, a mouth guard having a superior durability because of its high tear strength, which is prepared from a composition comprising a styrene block copolymer, an alicyclic saturated hydrocarbon-based resin and/or an ester gum, and an organopolysiloxane in which at least one of organic groups directly bound to the silicon atom in one molecule thereof is a phenyl group, a methylstyryl group, or an alkyl group having 7~30 carbon atoms, in predetermined proportions. However, not only tearing off on the occlusion surface but also worsening of the fitness caused by deformation of the mouth guard when the mouth guard is strongly chewed when it is set decreases the durability of the mouth guard. In addition, the thickness on the occlusion surface becomes thinner in use than it was originally designed, resulting in lowering an impact absorption force. Such problems occur due to a characteristic of the conventional mouth guards such that they likely generate plastic deformation when a strong occlusion force is applied. This characteristic is commonly found in the composition as disclosed in Japanese Laid-Open Patent No. 2001-54610, and hence, improvements have been demanded.

Moreover, when the conventional mouth guards are formed, a mouth guard composition provided in a sheet-like state is formed using a forming device while heating and sucking it. However, when the mouth guard compositions containing, as a major component, a polyolefin-based rubber or an ethylene-vinyl acetate copolymer, as currently used are used in the above-described method, such compositions were poor in forming properties due to a low fluidity after heating and softening, resulting in the production of incomplete mouth guards with poor fitness. Also, the mouth guards prepared from the conventional mouth guard compositions involved such a problem that when they are used repeatedly, their surfaces are most likely to be sticky by influences of saliva in an oral cavity, etc. becoming unsanitary, resulting in the generation of an offensive smell in use.

SUMMARY OF THE INVENTION

The present invention is aimed to provide a mouth guard composition which hardly generates plastic deformation as compared with the currently employed mouth guard compositions and which is high in fluidity during the formation after heating and softening and superior in fitness, and which even after repeated use of a mouth guard prepared therefrom, is free from sticking with respect to its surface and does not cause an offensive smell.

The present inventors made extensive and intensive investigations to achieve the above-described aim. As a result, it has been found that when, for the purpose of improving the fluidity during heating, a styrene block copolymer is compounded with at least one thermoplastic resin selected from an alicyclic saturated hydrocarbon-based resin, a terpene resin, and an aliphatic petroleum resin, and further with a specific wax, the resulting composition hardly generates plastic deformation and that even after repeated use of a mouth guard prepared therefrom, the mouth guard is free from sticking with respect to its surface and does not cause an offensive smell, leading to accomplishment of the invention.

Specifically, the mouth guard composition according to the invention comprises (A) 39~98% by weight of a styrene block copolymer, (B) 1~60% by weight of at least one thermoplastic resin selected from the group consisting of an alicyclic saturated hydrocarbon-based resin, a terpene resin, and an aliphatic petroleum resin, and (C) 1~40% by weight of at least one wax selected from the group consisting of a mineral wax, a synthetic wax, a vegetable-based wax, and an animal-based wax.

DETAILED DESCRIPTION OF THE INVENTION

The styrene block copolymer that is the component (A) used in the mouth guard composition according to the present invention is a basic component for imparting elasticity and durability as a mouth guard. Examples of the styrene block copolymer include a block copolymer of polystyrene and polybutadiene, a block copolymer of polystyrene and polyisoprene, and a block copolymer of polystyrene and a polyolefin. Of these block copolymers, the most desired is the block copolymer of polystyrene and a polyolefin in terms of hardness, softening temperature, etc. required for the mouth guard. Further, in order to utilize the characteristics of the styrene block copolymer, it is preferred that a block of polystyrene is present in an amount of 10~90% by weight in the block copolymer.

It is necessary that the content of the component (A) is from 39 to 98% by weight of the whole of the mouth guard composition. When the content of the component (A) is less than 39% by weight, the hardness is not satisfactory. On the other hand, when it exceeds 98% by weight, the softening temperature increases so that the formation and trimming become difficult.

The at least one thermoplastic resin selected from the group consisting of an alicyclic saturated hydrocarbon-based resin, a terpene resin, and an aliphatic petroleum resin, that is the component (B) has an effect for increasing the fluidity during heating and softening. Also, when used together with the component (C) as described later in detail, the component (B) has an effect for making the composition hardly generate the plastic deformation.

General alicyclic saturated hydrocarbon-based resins have a number average molecular weight of 500~900. In the present invention, those having a number average molecular weight of 550~650 are preferred for easily softening the composition for the purpose of the preparation of a mouth guard. The terpene resin includes not only usual terpene resins but also hydrogenated terpene resins. In the present invention, the hydrogenated terpene resins can also be employed. It is preferred that any of terpene resins have a number average molecular weight of 400~800. As the aliphatic petroleum resin, those having a number average molecular weight of 700~1,200 can be suitably used in the present invention. These thermoplastic resins may be used singly or in combination of two or more thereof. The content of the component (B) is from 1 to 60% by weight, and is preferable in particular from 10 to 25% by weight of the whole of the mouth guard composition. When the content of the component (B) is less than 1% by weight, the effect for improving the fluidity during heating and softening is not satisfactory. On the other hand, when it exceeds 60% by weight, the strength of the mouth guard is lowered so that it cannot endure a strong occlusion force.

The at least one wax selected from the group consisting of a mineral wax, a synthetic wax, a vegetable-based wax, and an animal-based wax, that is the component (C), gives the following characteristics. That is, when used together with the component (B), the mouth guard hardly generates plastic deformation when a strong force is applied to the mouth guard; and even after repeated use in an oral cavity, the mouth guard is free from sticking with respect to its surface and does not cause an offensive smell. Typical examples of the wax as the component (C) are as follows. The mineral wax includes a paraffin wax and a microcrystalline wax; the synthetic wax includes a low molecular weight polyethylene and a Fischer-Tropsch wax; the vegetable-based wax includes a carnauba wax and a candelilla wax; and the animal-based wax includes a bees wax and a shellac.

The content of the component (C) is from 1 to 40% by weight, and is preferable in particular from 10 to 25% by weight of the whole of the mouth guard composition. When the content of the component (C) is less than 1% by weight, the mouth guard is liable to generate plastic deformation, and after repeated use in an oral cavity, the surface of the mouth guard is likely to be sticky. On the other hand, when it exceeds 40% by weight, the durability is decreased since the tear strength is lowered.

The mouth guard composition according to the present invention may further contain various inorganic or organic coloring agents, or known antibacterial agent so far as its characteristics are not lost.

The mouth guard composition according to the present invention will be described in more detail with reference to the following Examples. It should not be construed that the present invention is limited thereto.

EXAMPLE 1

| (A) | Block copolymer of polystyrene and polyolefin: | 72% by weight |
|---|---|---|
| (B) | Alicyclic saturated hydrocarbon-based resin (number average molecular weight: 570): | 15% by weight |
| (C) | Paraffin wax (mineral wax): | 13% by weight |

The above components were kneaded in a pressure kneader under heating at 130 to 150° C., and the mixture was formed into a sheet having a diameter of 130 mm and a thickness of 3 mm. This disc-like mouth guard composition was evaluated with respect to the plastic deformation, the fluidity, and the state after setting in an oral cavity. Also, the tear strength that is a necessary characteristic for the mouth guard was also evaluated. The results obtained are summarized and shown in Table 1.

(Evaluation of Plastic Deformation)

In order to evaluate the state of plastic deformation after application of an impact, the mouth guard composition was placed on an iron plate having a thickness of 1 cm, and an iron ball having a weight of 1 kg was dropped thereon from a height of 500 mm. Then, the degree of dent remaining on the surface was visually evaluated.

(Fluidity)

Using a dynamic viscoelasticity measurement device (trade name: Reogel-E2500, manufactured by UBM), a storage elastic modulus (G') at 140° C. as the general formation temperature and at a frequency of 10 Hz was measured. The smaller the storage elastic modulus (G'), the more improved the fluidity, so that the composition is easily formed.

(Evaluation of the State After Setting in an Oral Cavity)

A mouth guard was actually prepared and then examined for the fitting state in an oral cavity. Also, after repeated use of 10 times in the oral cavity, the mouth guard was evaluated for the stickiness with respect to its surface, the state of deformation, and the smell at that time.

(Evaluation of Tear Strength)

Using a B type according to JIS K6252, the tear strength was measured at a crosshead speed of 500 mm/min. by means of a universal testing machine (trade name: Autograph, manufactured by Shimadzu Corporation).

EXAMPLE 2

| (A) | Block copolymer of polystyrene and polyolefin: | 59% by weight |
|---|---|---|
| (B) | Aliphatic hydrocarbon resin (number average molecular weight: 800): | 1% by weight |
| (C) | Paraffin wax (mineral wax): | 40% by weight |

A mouth guard composition composed of the above components was formed into a disc in the same manner as in Example 1 and then subjected to various tests in the same manners as in Example 1. The results obtained are shown in Table 1.

EXAMPLE 3

| | | |
|---|---|---|
| (A) | Block copolymer of polystyrene and polyisoprene: | 40% by weight |
| (B) | Hydrogenated terpene resin (number average molecular weight: 670): | 55% by weight |
| (C) | Bees wax (animal-based wax): | 5% by weight |

A mouth guard composition composed of the above components was formed into a disc in the same manner as in Example 1 and then subjected to various tests in the same manners as in Example 1. The results obtained are shown in Table 1.

Comparative Example 1

Using a commercially available mouth guard made of an ethylene-vinyl acetate copolymer (trade name: Drufosoft, made by Dreve), various tests were carried out in the same manners as in Example 1. The results obtained are shown in Table 1.

Comparative Example 2

| | | |
|---|---|---|
| (A) | Block copolymer of polystyrene and polyolefin: | 83% by weight |
| (B) | Ester gum (glycerin ester of rosin): | 12% by weight |
| (C) | Methylphenyl dimethylpolysiloxane: | 5% by weight |

A mouth guard composition composed of the above components was formed into a disc in the same manner as in Example 1 and then subjected to various tests in the same manners as in Example 1. The results obtained are shown in Table 1.

As is clear from Table 1, it could be confirmed that the mouth guard compositions according to the present invention are not deformed even after the application of an impact, while keeping a sufficient tear strength, and are high in fluidity (G' is low) even at the general formation temperature (140° C.) by means of a heating formation device and can be readily formed, and hence, are good in fitness; and that the mouth guards prepared therefrom neither generate deformation nor cause an offensive smell even after repeated use in the oral cavity. On the other hand, Comparative Example 1 relates to a mouth guard made of the commercially available ethylene-vinyl acetate copolymer, which likely generates plastic deformation after the application of an impact and is poor in fitness. In Comparative Example 2, though the styrene block copolymer is used, the components (B) and (C) as in the present invention are not compounded. Accordingly, the composition is liable to generate deformation after the application of an impact and is poor in the fitting state as compared with those of the present invention. In both the Comparative Examples, it was observed that the mouth guards are sticky and generate deformation and cause an offensive smell after repeated use.

As described above in detail, the mouth guard composition according to the present invention hardly generates plastic deformation, while keeping a sufficient tear strength, and is high in fluidity and can be readily formed, and hence, is superior in fitness during the formation after heating and softening, and even after repeated use of a mouth guard prepared therefrom, the mouth guard is free from sticking with respect to its surface and does not cause an offensive smell. Accordingly, the present invention is greatly valuable in contributing to the sport and dental fields.

While the invention has been described in detail and with reference to specific embodiments thereof, it will be apparent to one skilled in the art that various changes and modifications can be made therein without departing from the spirit and scope thereof.

What is claimed is:

1. A mouth guard composition comprising:
   (A) 30 to 98% by weight of a styrene block copolymer;
   (B) 1 to 60% by weight of at least one thermoplastic resin selected from the group consisting of an alicyclic saturated hydrocarbon-based resin a terpene resin; and
   (C) 5 to 40% by weight of at least one wax selected from the group consisting of a mineral wax, a vegetable-based wax, and an animal-based wax.

2. The mouth guard composition according to claim 1, wherein the styrene block copolymer is a block copolymer of polystyrene and a polyolefin.

3. The mouth guard composition according to claim 1, comprising an alicyclic saturated hydrocarbon-based resin having a number average molecular weight of from 550 to 650.

TABLE 1

| | | Example No. | | | Comparative Example No. | |
|---|---|---|---|---|---|---|
| | | 1 | 2 | 3 | 1 | 2 |
| State of plastic deformation after application of impact | | The dent was not confirmed. | The dent was not confirmed. | The dent was not confirmed. | The dent was observed. | The dent was observed. |
| Storage elastic modulus: G' [(Pa) × $10^4$] | | 5.1 | 7.9 | 4.2 | 41 | 11 |
| Evaluation of the state after setting the mouth guard in oral cavity | | | | | | |
| Fitting state in oral cavity | | Good | Good | Good | The fitness in surroundings was poor. | The thickness was slightly non-uniform. |
| After repeated use of 10 times | Stickiness | Not sticky | Not sticky | Not sticky | Slightly sticky | Slightly sticky |
| | Deformation | Not deformed | Not deformed | Not deformed | The occlusion surface was deformed. | The occlusion surface was deformed. |
| | Smell | No smell | No smell | No smell | Offensive smell | Offensive smell |
| Tear strength (kgf/cm) | | 38.3 | 42.5 | 36.1 | 30.2 | 40.2 |

4. The mouth guard composition according to claim 1, comprising a terpene resin having a number average molecular weight of from 400 to 800.

5. The mouth guard composition according to claim 1, further comprising an aliphatic petroleum resin having a number average molecular weight of from 700 to 1,200.

6. The mouth guard composition according to claim 1, wherein the styrene block copolymer is at least one selected from the group consisting of a block copolymer of polystyrene and polybutadiene, a block copolymer of polystyrene and polyisoprene, and a block copolymer of polystyrene and a polyolefin.

7. The mouth guard composition according to claim 1, comprising a styrene block copolymer wherein the polystyrene block is present in an amount of from about 10 to 90% by weight of the weight of the styrene block copolymer.

8. The mouth guard composition according to claim 1, comprising a paraffin wax.

9. The mouth guard composition according to claim 1, further comprising at least one of a low molecular weight polyethylene of a Fisher-Tropsch wax.

10. The mouth guard composition according to claim 1, comprising at least one of a carnauba wax or a candelilla wax.

11. The mouth guard composition according to claim 1, comprising beeswax.

12. The mouth guard composition according to claim 1, wherein the wax is present in an amount of from 10 to 25% by weight based on the total weight of the mouth guard composition.

13. The mouth guard composition according to claim 1, comprising a block copolymer of polystyrene and a polyolefin; an alicyclic saturated hydrocarbon; and beeswax.

14. The mouth guard composition according to claim 1, comprising an alicyclic saturated hydrocarbon-based resin and a paraffin wax.

15. The mouth guard composition according to claim 1, wherein the wax is selected from the group consisting of a paraffin wax, beeswax and a mixture of paraffin wax and beeswax.

16. The mouth guard composition according to claim 1, comprising a hydrogenated terpene resin and beeswax.

* * * * *